June 3, 1969              J. GODET              3,447,283
DEVICE FOR FILLING STORAGE CONTAINERS WITH ROD-SHAPED
PRODUCTS AND ESPECIALLY CIGARS
Filed June 5, 1967

INVENTOR
Jean Godet

By
Sparrow and Sparrow
ATTORNEYS

United States Patent Office 3,447,283
Patented June 3, 1969

3,447,283
DEVICE FOR FILLING STORAGE CONTAINERS WITH ROD-SHAPED PRODUCTS AND ESPECIALLY CIGARS
Jean Godet, Paris, France, assignor to Service d'Exploitation Industrielle des Tabacs et des Allumettes, Paris, France, a French public establishment
Filed June 5, 1967, Ser. No. 643,626
Claims priority, application France, June 8, 1966, 64,716
Int. Cl. B65b *19/34, 35/40*
U.S. Cl. 53—148                                6 Claims

ABSTRACT OF THE DISCLOSURE

An intermediate storage receptacle in a device for automatically filling rod-shaped products conveyed by feeding means into containers, the receptacle located between the feeding means and the containers. A cyclically reciprocating sliding support between the feeding means and the receptacle for temporary accumulation of a predetermined number of the products; pusher plates reciprocatingly movable in opposite directions underneath the sliding support, which move the accumulated products in orderly rows into the intermediate storage receptacle.

---

There has already been described in the U.S. patent application Ser. No. 615,251, filed on Feb. 10, 1967 which is a continuation-in-part of application Ser. No. 461,845, filed on June 7, 1965 and now abandoned, a device whereby containers such as those comprising partition walls and forming compartments which are swept vertically by a moving retaining plate are filled automatically with rod-shaped products conveyed by feeding means. Said device comprises between said feeding means and the container to be filled an intermediate storage receptacle fitted with a movable base whose opening motion is controlled cyclically in such a manner as to release its contents at predetermined time intervals. In this device, the feeding operation was continuous and provision was made for a shielding member so arranged and controlled as to interrupt the supply to said intermediate receptacle over a predetermined fraction of said time interval corresponding to the time required for opening and closing the movable base.

One potential hazard in a device of this type lies in the fact that the products may not move down correctly inside the feed hopper, especially within the chute and at the ends of the guides, and that they may thus be presented inside the containers in incorrect positions, askew and so forth.

The object of this invention is to overcome these drawbacks and to ensure correct distribution of products.

To this end, it is intended according to the invention to interpose between the feeding means and the intermediate storage receptacle retractable means for accumulating products conveyed by said feeding means during one distribution cycle, that is to say during the time interval which elapses between two successive openings of said intermediate storage receptacle.

The accumulating means can consist of two plates for holding the ends of the products, said plates being pivotally mounted on hinge-pins at right angles to the axes of said products and located at a distance from each other which is slightly greater than the length of said products.

If the supply of products is continuous, provision can additionally be made for a sliding support member which is adapted to accompany the products while the accumulating means are in the withdrawn position and to return to its retracted position while permitting the products to accumulate when said accumulating means have returned to their active or non-withdrawn position.

In a particularly advantageous embodiment, provision is made for two stationary tables which are joined to the inlet of the intermediate storage receptacle, the products being intended to fall onto said tables when the accumulating means retract, two movable push-plates being slidably mounted on said tables and capable of being endowed at the same time with a reciprocating movement in opposite directions on each side of said intermediate storage receptacle. The maximum spacing between the push-plates can correspond to the total length of the accumulating members.

One exemplified embodiment of an improved device according to the invention will now be described without any limitation being implied, reference being made to the accompanying drawings, in which.

Figure 1:
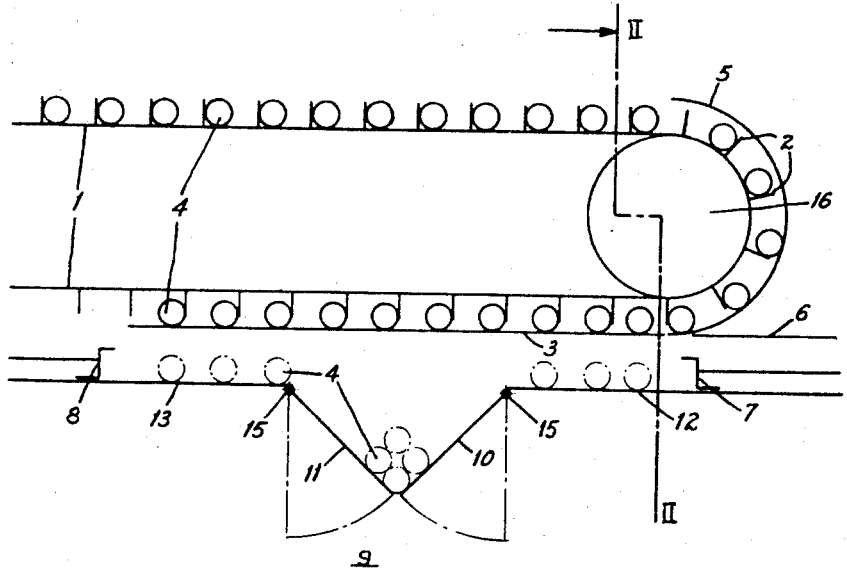
FIG. 1 is a diagrammatic sectional view of the complete device.
Figure 2:
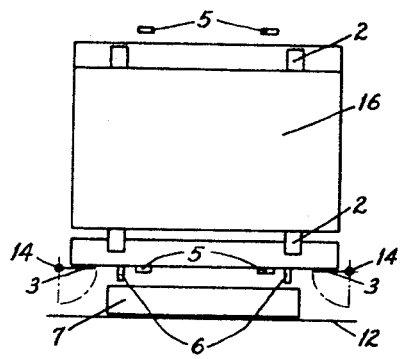
FIG. 2 is a sectional view taken along line II—II of FIG. 1.

Beneath the bottom run of the belt conveyor 1 which is fitted with cross-strips or flights 2, there are placed two holding plates 3 having a suitable width and spacing for the purpose of supporting the products 4 at their extremities. Said plates 3 are pivoted about two parallel pins 14 located on each side of the conveyor at right angles to the axes of the products 4 and at a distance from each other which is greater than the length of said products. The length of said plates is suitable for the purpose of supporting a predetermined number of products. Starting from the delivery end of the guide shell 5 which surrounds the idler drum 16 of the conveyor belt 1, said plates are placed at a level which is such that the flights 2 are capable of pushing the products along said holding plates.

A sliding support member 6 is mounted at the same level as the holding plates 3 and, starting from the underside of the shell 5, is capable of moving between the two plates 3 in synchronism with the conveyor belt 1 first down-stream then in a rapid return movement in the upstream direction. Two push-plates 7 and 8 are intended to slide in a simultaneous reciprocating movement in opposite directions on each side of the intermediate storage receptacle 9 as constituted especially by two shutters or flaps 10 and 11 which are pivotally mounted at their top edges 15. The two push-plates 7 and 8 are adapted to move from their end positions of maximum separation corresponding to the length of the two plates 3 up to the pivot-pins 15 along two stationary horizontal plates 12 and 13 which constitute the other portion of the intermediate storage receptacle 9.

The products 4 which are delivered continuously by the conveyor 1 and maintained in the correct positions by the flights 2 and the shell 5 are received one by one on the support 6 which moves forward at the same speed as the conveyor belt and on which they remain aligned between the flights 2. When the holding plates 3 which were in the vertical position return to their horizontal positions, the support 6 moves back rapidly and the products 4 are deposited at their ends on the holding plates 3. The flights 2 continue to move the products forward until the moment when the plates 3 which are controlled cyclically swing down and release the products onto the plates 12 and 13. The products located at the center fall within the angle made by the flaps 10 and 11. The push-plates 7 and 8 move towards each other and push the other products against each other so as to cause them to slide back and collect on the two flaps. When all the products are collected together, the push-plates return to their end positions, the flaps 10 and 11 open and allow the products to move down towards the compartment to be filled. During this time, the newly-supplied cigars or rod-shaped products which are delivered by the conveyor have been collected by the support 6 which has resumed its forward motion.

The result of all the movements thus performed is to deposit the products on the plates 12 and 13 in a position which corresponds substantially to their positions between the flights 2. Their axes are thus virtually parallel; subsequent packing operations can accordingly be carried out without any danger.

The products which fall directly into the feed-hopper 9 and then those which fall therein under the action of the push-plates 7 and 8 are adapted to slide over the flaps 10 and 11 which are uniformly spaced on each side and are normally packed in contact with each other without any attendant danger of overlapping or formation of bridges.

What I claim is:

1. A device for automatically filling containers with rod-shaped products conveyed by feeding means; comprising an intermediate storage receptacle between said feeding means and said container, said receptacle having a movable base, said base having a cyclically controlled opening motion for releasing its contents at predetermined time intervals, means interposed between said feeding means and said intermediate storage receptacle for receiving and supporting a predetermined number of products, said interposed means adapted to accumulate said products during said time interval elapsing between two successive openings of said intermediate storage receptacle, a sliding support member adapted to accompany said products while said accumulating means are in the withdrawn position, and to return to its retracted position while permitting said products to accumulate when said accumulating means have returned to their active or non-withdrawn position.

2. A device according to claim 1, said accumulating means comprising two plates for holding the ends of said products, said plates being pivotally mounted on hinge pins at right angles to the axes of said products, said plates located at a distance from each other which is slightly greater than the length of said products.

3. In a device according to claim 1, said products being supplied in continuous operation, further comprising a sliding support member adapted to accompany said products while said accumulating means are in the withdrawn position, and to return to its retracted position while permitting said products to accumulate when said accumulating means have returned to their active or non-withdrawn position.

4. A device according to claim 1 further comprising two stationary tables assembled at the inlet of said intermediate storage receptacle, said products being intended to drop on said tables when said accumulating means retract, two movable push-plates slidably mounted on said tables, and said push-plates having a reciprocating movement in opposite directions on each side of said intermediate storage receptacle.

5. A device for automatically filling containers with rod-shaped products conveyed by feeding means; comprising an intermediate storage receptacle between said feeding means and said container, said receptacle having a movable base, said base having a cyclically controlled opening motion for releasing its contents at predetermined time intervals, means interposed between said feeding means and said intermediate storage receptacle for receiving and supporting a predetermined number of products, said interposed means adapted to accumulate said products during said time interval elapsing between two successive openings of said intermediate storage receptacle, two stationary tables assembled at the inlet of said intermediate storage receptacle, said products being intended to drop on said tables when said accumulating means retract, two movable push-plates slidably mounted on said tables, and said push-plates having a reciprocating movement in opposite directions on each side of said intermediate storage receptacle.

6. In a device according to claim 5, the maximum spacing between said push-plates corresponding to the total length of said accumulating members.

References Cited

UNITED STATES PATENTS

| | | | |
|---|---|---|---|
| 2,053,418 | 9/1936 | Braren | 53—64 X |
| 3,027,699 | 4/1962 | Miller et al. | 53—236 |

TRAVIS S. McGEHEE, *Primary Examiner.*

U.S. Cl. X.R.

53—236